(12) United States Patent
Kunieda et al.

(10) Patent No.: US 8,808,633 B2
(45) Date of Patent: Aug. 19, 2014

(54) SILICO-ALUMINO PHOSPHATE, HONEYCOMB STRUCTURAL BODY AND EXHAUST GAS CONVERSION APPARATUS

(75) Inventors: Masafumi Kunieda, Gifu (JP); Yosuke Matsukawa, Gifu (JP); Takunari Murakami, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 281 days.

(21) Appl. No.: 13/218,525

(22) Filed: Aug. 26, 2011

(65) Prior Publication Data
US 2012/0058018 A1 Mar. 8, 2012

(30) Foreign Application Priority Data
Sep. 2, 2010 (WO) .................. PCT/JP2010/065050

(51) Int. Cl.
*B01D 50/00* (2006.01)
(52) U.S. Cl.
USPC ........................................ 422/177; 422/180
(58) Field of Classification Search
USPC ........................... 422/177, 180; 502/242, 244
See application file for complete search history.

(56) References Cited

U.S. PATENT DOCUMENTS

| | | | | |
|---|---|---|---|---|
| 4,417,908 A | * | 11/1983 | Pitcher, Jr. | ........................ 55/523 |
| 2003/0006518 A1 | * | 1/2003 | Miyakawa et al. | .............. 264/42 |
| 2003/0100446 A1 | * | 5/2003 | Hase et al. | ..................... 502/302 |
| 2005/0249661 A1 | | 11/2005 | Higuchi et al. | |
| 2008/0118682 A1 | * | 5/2008 | Ido et al. | ...................... 428/34.1 |
| 2008/0241060 A1 | | 10/2008 | Li et al. | |
| 2008/0317999 A1 | | 12/2008 | Patchett et al. | |
| 2009/0196812 A1 | * | 8/2009 | Bull et al. | ................... 423/239.1 |
| 2010/0092361 A1 | * | 4/2010 | Li et al. | ....................... 423/239.2 |

FOREIGN PATENT DOCUMENTS

| | | |
|---|---|---|
| EP | 0396085 | 11/1990 |
| EP | 2324920 | 5/2011 |
| EP | 2338862 | 6/2011 |
| JP | 07-155614 | 6/1995 |
| JP | 08-310810 | 11/1996 |
| JP | 2004-043296 | 2/2004 |
| JP | 2006-089300 | 4/2006 |
| JP | 2010-516466 | 5/2010 |
| JP | 2010-522688 | 7/2010 |
| JP | 2010280516 A * | 12/2010 |
| WO | WO 2006/137149 | 12/2006 |
| WO | WO 2008/118434 | 10/2008 |
| WO | WO 2009/099937 | 8/2009 |
| WO | WO 2010/084930 | 7/2010 |

OTHER PUBLICATIONS

Extended European Search Report for corresponding EP Application No. 11175944.5-1270, Oct. 13, 2011.

* cited by examiner

*Primary Examiner* — Tom Duong
(74) *Attorney, Agent, or Firm* — Mori & Ward, LLP

(57) ABSTRACT

A silico-alumino phosphate includes Si, Al, and P. A ratio of an amount of substance of Si to a sum of an amount of substance of Al and an amount of substance of P is approximately 0.22 or more and approximately 0.33 or less. An acid point is approximately 1.2 mmol/g or more. A honeycomb structural body includes a honeycomb unit. The honeycomb unit includes the silico-alumino phosphate and an inorganic binder. The honeycomb unit has a plurality of through-holes divided by a plurality of partition walls and arranged in a longitudinal direction of the honeycomb unit. An exhaust gas conversion apparatus includes the honeycomb structural body, a holding sealing member and a metal pipe. The holding sealing member is provided at an outer peripheral portion of the honeycomb structural body. The honeycomb structural body and the holding sealing member are installed in the metal pipe.

56 Claims, 2 Drawing Sheets

SILICO-ALUMINO PHOSPHATE, HONEYCOMB STRUCTURAL BODY AND EXHAUST GAS CONVERSION APPARATUS

CROSS-REFERENCE TO RELATED APPLICATIONS

The present application claims priority under 35 U.S.C. §119 to International Application No. PCT/JP2010/65050, filed on Sep. 2, 2010. The contents of this application are incorporated herein by reference in their entirety.

BACKGROUND OF THE INVENTION

1. Field of the Invention

The present invention relates to silico-alumino phosphate, a honeycomb structural body and an exhaust gas conversion apparatus.

2. Discussion of the Background

Conventionally, as one of the automotive exhaust gas converting systems, an SCR (Selective Catalytic Reduction) system has been known in which NOx is reduced to nitrogen and water by using ammonia.

In the SCR system, zeolite is known as a material for absorbing ammonia.

In WO 06/137149 A1, a honeycomb structural body including a honeycomb unit containing zeolite, inorganic fibers and/or inorganic whiskers, and inorganic binders is disclosed.

The contents of International Patent Publication No. WO06/137149 A1 are incorporated herein.

SUMMARY OF THE INVENTION

According to one aspect of the present invention, a silico-alumino phosphate includes Si, Al, and P. A ratio of an amount of substance of Si to a sum of an amount of substance of Al and an amount of substance of P is approximately 0.22 or more and approximately 0.33 or less. An acid point is approximately 1.2 mmol/g or more.

According to another aspect of the present invention, a honeycomb structural body includes a honeycomb unit. The honeycomb unit includes the silico-alumino phosphate and an inorganic binder. The honeycomb unit has a plurality of through-holes divided by a plurality of partition walls and arranged in a longitudinal direction of the honeycomb unit.

According to further aspect of the present invention, a honeycomb structural body includes a honeycomb unit. The honeycomb unit includes cordierite and has a plurality of through-holes divided by a plurality of partition walls and arranged in a longitudinal direction of the honeycomb unit. The plurality of partition walls carry the silico-alumino phosphate.

According to further aspect of the present invention, an exhaust gas conversion apparatus includes the honeycomb structural body, a holding sealing member and a metal pipe. The holding sealing member is provided at an outer peripheral portion of the honeycomb structural body. The metal pipe has the honeycomb structural body and the holding sealing member installed in the metal pipe.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
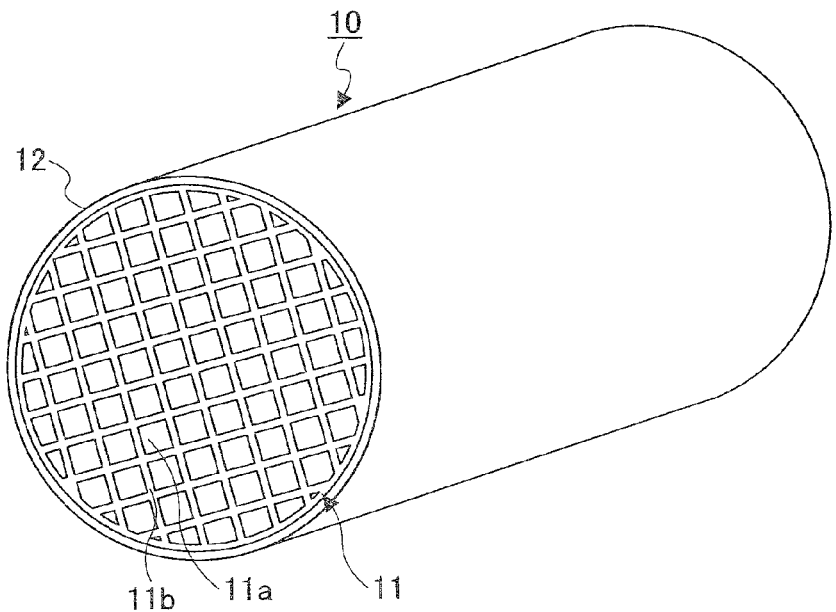
FIG. 1 is a perspective view illustrating an example of a honeycomb structural body according to an embodiment of the present invention.

A silico-alumino phosphate according to an embodiment of the present invention has an amount of substance ratio of Si to a sum of an amount of substance of Al and P being approximately 0.22 or more and approximately 0.33 or less, and an acid point being approximately 1.2 mmol/g or more.

A honeycomb structural body according to another embodiment of the present invention includes a honeycomb unit including the silico-alumino phosphate according to the embodiment of the present invention and an inorganic binder and having a plurality of through-holes divided by partition walls and arranged in a longitudinal direction thereof.

A honeycomb structural body according to another embodiment of the present invention includes a honeycomb unit including cordierite and having a plurality of through-holes divided by partition walls and arranged in a longitudinal direction thereof, wherein the partition walls carry the silico-alumino phosphate according to the embodiment of the present invention.

An exhaust gas conversion apparatus according to another embodiment of the present invention includes the honeycomb structural body according to the embodiment of the present invention, a holding sealing member provided at an outer peripheral part of the honeycomb structural body, and a metal pipe having the honeycomb structural body and the holding sealing member installed therein.

The embodiments will now be described with reference to the accompanying drawings, wherein like reference numerals designate corresponding or identical elements throughout the various drawings.

A NOx conversion efficiency higher than that of the conventional honeycomb structural body of International Patent Publication No. WO06/137149 A1 is desired. SAPO-34 having a satisfactory NOx conversion efficiency is considered to be used as zeolite.

Meanwhile, by absorbing or desorbing SAPO-34 with water, SAPO-34 shrinks or expands such that the lattice constant of SAPO-34 changes.

With an embodiment of the present invention, a silico-alumino phosphate having satisfactory NOx conversion efficiency and being capable of restraining the shrinkage due to absorbing of water and the expansion due to desorbing of water, a honeycomb structural body including a honeycomb unit containing the silico-alumino phosphate, and an exhaust gas conversion apparatus including the honeycomb structural body can be obtained.

In the following, embodiments of the present invention are described with reference to the accompanying drawings.

FIG. 1 illustrates an example of a honeycomb structural body according to an embodiment of the present invention. The honeycomb structural body 10 includes a silico-alumino phosphate and an inorganic binder. The honeycomb structural body 10 has an outer peripheral coating layer 12 formed on an outer peripheral surface of a single honeycomb unit 11 including plural through-holes 11a partitioned by partition walls 11b and arranged in a longitudinal direction thereof.

The silico-alumino phosphate has an amount of substance ratio of Si (Silicon) to a sum of an amount of substance of Al (Aluminum) and P (Phosphorous) that is approximately 0.22 or more and approximately 0.33 or less, and more preferably approximately 0.26 or more and approximately 0.33 or less. In a case where the silico-alumino phosphate has amount of substance ratio of Si to a sum of an amount of substance of Al and P that is approximately 0.22 or more, it becomes easier to restrain shrinkage due to water being absorbed by the silico-alumino phosphate and expansion due to water being desorbed by the silico-alumino phosphate. On the other hand, in a case where the silico-alumino phosphate has amount of substance ratio of Si to a sum of an amount of substance of Al and P that is approximately 0.33 or less, it becomes difficult to manufacture the honeycomb unit 11 due to the silico-alumino phosphate becoming amorphous.

It is to be noted that the unit for the amount of substance in the present invention is mol. The ratio of the amount of substance of Si to the sum of the amount of substance of Al and P (i.e. mol ratio) can be measured by using an energy dispersive X-ray Spectroscopy (EDS) apparatus.

The silico-alumino phosphate has an acid point of approximately 1.2 mmol/g or more, more preferably approximately 1.5 mmol/g or more, and still more preferably 2.2 mmol/g or more. In a case where the acid point of silico-alumino phosphate is less than 1.2 mmol/g, it becomes difficult for the ion exchange amount to decrease when performing ion exchange of the silico-alumino phosphate, thereby becoming easier to improve the effect of improving NOx conversion efficiency. In this case, the upper limit of the acid point of silico-alumino phosphate is the theoretical value calculated from a formula of (ratio of the amount of substance of Si to the sum of the amount of substance of Al and P)×12.9 [mmol/g].

The acid point of silico-alumino phosphate can be measured by an ammonia temperature-programmed desorption method (also referred to as "$NH_3$-TPD").

The silico-alumino phosphate can be synthesized by forming a gel precursor by adding phosphate, aluminum hydroxide, silica, and a structure directing agent (SDA) into water and then heating the gel precursor.

It is to be noted that the structure directing agent is a mold used for forming a regular porous structure when synthesizing silico-alumino phosphate.

By adjusting the ratio of the sum of the amount of substance of phosphate and aluminum hydroxide to the amount of substance of silica, the ratio of silico-alumino phosphate to the sum of the amount of substance of AL and P can be controlled. Further, by adjusting the amount of the structure directing agent addition, the acid point of silico-alumino phosphate can be controlled.

Although the structure directing agent is not limited in particular, the structure directing agent may be, for example, morpholine, diethyl-amine, tetraethyl-ammonium-hydroxide, triethyl-amine, or two or more combinations thereof.

Considering the NOx conversion efficiency, it is preferable for silico-alumino phosphate to be ion-exchanged with copper ions and/or iron ions.

The silico-alumino phosphate being ion-exchanged with copper ions and/or iron ions is preferred to have an ion exchange amount from approximately 1.0 to approximately 5.0 mass %. In a case where the ion exchange amount of silico-alumino phosphate is approximately 1.0 mass % or more, the NOx conversion efficiency can be obtained easier. On the other hand, in a case where the ion exchange amount of silico-alumino phosphate is approximately 5.0 mass % or less, it becomes difficult for the water resistance and/or heat resistance to degrade. For example, it becomes difficult for the NOx conversion efficiency to be reduced at a high temperature of 500° C., or more.

It is to be noted that silico-alumino phosphate may be ion-exchanged with metal ions other than those described above.

The average particle diameter of the primary particles of silico-alumino phosphate is preferred to be approximately 1 to approximately 5 μm. In a case where the average particle diameter of the primary particles of silico-alumino phosphate is 1 μm or more, it becomes easier for exhaust gas to permeate through the inside of a partition wall 11b such that silico-alumino phosphate can effectively used for NOx conversion more easily. On the other hand, in a case where the average particle diameter of the primary particles of silico-alumino phosphate is approximately 5 μm or less, it becomes difficult for the porosity of the honeycomb unit 11 to be increased and difficult for the strength of the honeycomb unit 11 to be reduced. Further, in the case where the average particle diameter of the primary particles of silico-alumino phosphate is approximately 5 μm or less, it becomes difficult for the specific surface area of silico-alumino phosphate to be reduced and difficult for the NOx conversion efficiency to be reduced.

It is to be noted that the average particle diameter of the primary particles of silico-alumino phosphate is normally approximately 20 μm or less. However, in the case of using silico-alumino phosphate as the material of the honeycomb unit 11, the average particle diameter of the primary particles of silico-alumino phosphate is reduced by grinding the silico-alumino phosphate.

The honeycomb unit 11 is preferred to have a silico-alumino phosphate content by weight per apparent volume from approximately 230 to approximately 360 g/L. In a case where the silico-alumino phosphate content by weight per apparent volume is approximately 230 g/L or more, the apparent volume of the honeycomb unit 11 does not need to be increased in order to improve the NOx conversion efficiency. On the other hand, in a case where the silico-alumino phosphate content by weight per apparent volume is 360 g/L or less, it becomes difficult for the strength of the honeycomb unit 11 to be insufficient and difficult for the aperture ratio of the honeycomb unit 11 to decrease.

Although the inorganic binder included in the honeycomb unit 11 is not limited in particular, the inorganic binder may be, for example, a solid content of, for example, alumina sol, silica sol, titania sol, soluble glass, sepiolite, attapulgite, boehmite and the like. Two or more kinds of inorganic binders may be used.

The content of the inorganic binder as solid content of the honeycomb unit 11 is preferably approximately 5 to approximately 30 mass %, and more preferably approximately 10 to approximately 20 mass %. In a case where the content of the inorganic binder as solid content is 5 mass % or more, it becomes difficult for the strength of the honeycomb unit 11 to decrease. On the other hand, in a case where the content of the inorganic binder as solid content is approximately 30 mass % or less, it becomes less difficult to perform extrusion molding of the honeycomb unit 11.

In order to increase the strength of the honeycomb unit 11, it is preferable for the honeycomb unit 11 to further include one or more materials selected from a group of an inorganic fiber, a scale-like material, a tetrapod-shaped material, or a three-dimensional needle-shaped material.

The inorganic fiber included in the honeycomb unit 11 is not limited in particular. The inorganic fiber may be, for example, alumina fibers, silica fibers, silicon carbide fibers, silica alumina fibers, glass fibers, potassium titanate fibers, aluminum borate fibers and the like. Two or more types of inorganic fibers may be used.

The aspect ratio of the inorganic fibers is preferably approximately 2 to approximately 1000, more preferably, approximately 5 to approximately 800, and still more preferably, approximately 10 to approximately 500. In a case where the aspect ratio of the inorganic fibers is approximately 2 or more, the effect of increasing the strength of the honeycomb unit 11 may be easier to obtain. On the other hand, in a case where the aspect ratio of the inorganic fibers is approximately 1000 or less, it becomes difficult for clogging or the like, for example, to occur in the molding die when performing extrusion molding for forming the honeycomb unit 11. Further, it becomes difficult for breakage of the inorganic fibers to occur, such that the effect of increasing the strength of the honeycomb unit 11 can be easy to obtain.

The scale-like material refers to a planar material. It is preferable for the scale-like material to have a thickness of approximately 0.2 µm to approximately 5 µm and a maximum length of approximately 10 µm to approximately 160 µm.

The ratio of the maximum length of the scale-like material to the thickness of the scale-like material is preferably approximately 3 to approximately 250.

The scale-like material included in the honeycomb unit 11 is not limited in particular. The scale-like material included in the honeycomb unit 11 may be, for example, glass, muscovite, alumina, silica and the like. Two or more kinds of the scale-like material may be used.

The tetrapod-shaped material refers to a material having a needle-like part extending three-dimensionally. The average length of the needles of the needle-like part is preferably approximately 5 µm to approximately 30 µm. The average diameter of the needles of the needle-like part is preferably approximately 0.5 µm to approximately 5 µm.

The tetra-pod shaped material may be, for example, a single crystal material, a whisker material and the like.

The material of the tetrapod-shaped material included in the honeycomb unit 11 is not limited in particular. The material of the tetrapod-shaped material may be, for example, zinc oxide or the like. Two or more kinds of the tetrapod-shaped material may be used.

The three-dimensional needle-like material refers to a material including needle-like parts combined to each other by an inorganic compound (e.g., glass) at a center area of the needle-like parts. The average length of the needles of the needle-like parts is preferably approximately 5 µm to approximately 30 µm. The average diameter of the needles of the needle-like parts is preferably approximately 0.5 µm to approximately 5 µm.

Further, the needle-like parts may be connected three-dimensionally. The diameter of the needle-like parts is preferably approximately 0.1 µm to approximately 5 µm, the length of the needle-like parts is preferably approximately 0.3 µm to approximately 30 µm, and the ratio of the length of the needle-like parts to the diameter of the needle-like parts is preferably approximately 1.4 to approximately 50.

The three-dimensional needle-like material included in the honeycomb unit 11 is not limited in particular. The three-dimensional needle-like material may be, for example, alumina, silica, silicon carbide, silica alumina, glass, potassium titanate, aluminum borate, boehmite and the like. Two or more kinds of the three-dimensional needle-like material may be used.

The content of one or more kinds selected from a group of the inorganic fiber, the scale-like material, tetrapod-shaped material, and the three-dimensional needle-like material in the honeycomb unit 11 is preferably approximately 3 mass % to approximately 50 mass %, more preferably, approximately 3 mass % to approximately 30 mass %, and still more preferably, approximately 5 mass % to approximately 20 mass %. In a case where the content of one or more kinds selected from a group of the inorganic fiber, the scale-like material, the tetrapod-shaped material, and the three-dimensional needle-like material in the honeycomb unit 11 is approximately 3 mass % or more, the effect of increasing the strength of the honeycomb unit 11 becomes easy to obtain. On the other hand, in a case where the content of one or more kinds selected from a group of the inorganic fiber, the scale-like material, the tetrapod-shaped material, and the three-dimensional needle-like material in the honeycomb unit 11 is approximately 50 mass % or less, it becomes difficult for the content of silico-alumino phosphate in the honeycomb unit 11 to decrease and becomes easy to improve NOx conversion efficiency.

The porosity of the honeycomb unit 11 is preferably approximately 25% to approximately 40%. In a case where the porosity of the honeycomb unit 11 is approximately 25% or more, it becomes easy to allow exhaust gas to permeate into the partition walls 11b. Thus, it becomes easy for silico-alumino phosphate to be effectively used for NOx conversion. On the other hand, in a case where the porosity of the honeycomb unit 11 is approximately 40% or less, it becomes difficult for the strength of the honeycomb unit 11 to be insufficient.

It is to be noted that the porosity of the honeycomb unit 11 can be measured by using a mercury penetration method.

The aperture ratio of a cross section of the honeycomb unit 11 perpendicular to the longitudinal direction of the honeycomb unit 11 is preferably approximately 50% to approximately 75%. In a case where the aperture ratio of the cross section perpendicular to the longitudinal direction of the honeycomb unit 11 is approximately 50% or more, it becomes easy for the NOx conversion by the silico-alumino phosphate to be used effectively. On the other hand, in a case where the aperture ratio of the cross section perpendicular to the longitudinal direction of the honeycomb unit 11 is approximately 75% or more, it becomes difficult for the strength of the honeycomb unit 11 to be insufficient.

The density of the through-holes 11a of the cross section perpendicular to the longitudinal direction of the honeycomb unit 11 is preferably approximately 31 to approximately 155 units per $cm^2$. In a case where the density of the through-holes 11a of the cross section perpendicular to the longitudinal direction of the honeycomb unit 11 is less than approximately 31 units per $cm^2$, it becomes easy for exhaust gas and the silico-alumino phosphate to make contact. Thus, the NOx conversion efficiency may improve. On the other hand, in a case where the density of the through-holes 11a of the cross section perpendicular to the longitudinal direction of the honeycomb unit 11 is approximately 155 units per $cm^2$ or less, it becomes difficult for the pressure loss of the honeycomb structural body 10 to increase.

The thickness of the partition wall 11b of the honeycomb unit 11 is preferably approximately 0.10 mm to approximately 0.50 mm, and more preferably approximately 0.15 mm to approximately 0.35 mm. In a case where the thickness of the partition wall 11b approximately 0.10 mm or more, it becomes difficult for the strength of the honeycomb unit 11 to decrease. On the other hand, in a case where the thickness of the partition wall 11b is approximately 0.50 mm or less, it becomes easy to allow exhaust gas to permeate into the partition wall 11b. Thus, the silico-alumino phosphate can be effectively used for NOx conversion.

The thickness of the outer peripheral coating layer 12 is preferably approximately 0.1 mm to approximately 2 mm. In a case where the thickness of the outer peripheral coating layer 12 is approximately 0.1 mm or more, it becomes difficult for the effect of increasing the strength of the honeycomb structural body 10 to become insufficient. On the other hand, in a case where the thickness of the outer peripheral coating layer 12 is approximately 2 mm or less, it becomes difficult for the content of the silico-alumino phosphate per volume unit of the honeycomb structural body 10 to decrease. Thus, it becomes difficult for the NOx conversion efficiency to decrease.

Although the shape of the honeycomb structure 10 is substantially cylindrical, the shape of the honeycomb structure 10 is not limited in particular. For example, the shape of the honeycomb structure 10 may be a substantially rectangular pillar, a substantially cylindroid and the like. Further, although the shape of the through-holes 11a in this embodiment is a substantially square pillar, the shape of the through-holes is not limited in particular. The shape of the through-holes 11a may be, for example, a substantially triangular pillar, a substantially hexagonal pillar and the like.

Next, an example of a method for manufacturing the honeycomb structural body 10 according to an embodiment of the present invention is described. First, a raw substantially cylindrical honeycomb molded body, in which plural through-holes separated by walls are formed in parallel in a longitudinal direction, is manufactured by performing extrusion molding using a raw material paste containing a silico-alumino phosphate and an inorganic binder (and according to necessity, one or more kinds selected from a group of the inorganic fiber, the scale-like material, the tetrapod-shaped material, and the three-dimensional needle-like material). Thereby, a substantially cylindrical honeycomb unit 11 having sufficient strength can be formed even if firing temperature is low.

The inorganic binder contained in the raw material paste is not limited in particular. The inorganic binder is added as, alumina sol, silica sol, titania sol, soluble glass, sepiolite, attapulgite, boehmite and the like. Two or more kinds of inorganic binders may be used.

Further, an organic binder, a dispersion medium, a molding aid, and the like may be arbitrarily added to the raw material paste, if necessary.

The organic binder is not limited in particular. The organic binder may be, for example, methylcellulose, carboxymethyl cellulose, hydroxylethyl cellulose, polyethyleneglycole, phenol resin, epoxy resin and the like. Two or more kinds of organic binders may be used. The adding amount of the organic binder is preferably approximately 1 mass % to approximately 10 mass % of the total mass of the one or more kinds selected from a group of the silico-alumino phosphate, the inorganic binder, the inorganic fiber, the scale-like material, the scale-like particles, the tetrapod-shaped material, and the three-dimensional needle-like material.

The dispersion medium is not limited in particular. The dispersion medium may be, for example, water, an organic solvent such as benzene, alcohol such as methanol, and the like. Two or more kinds of dispersion media may be used.

The molding aid is not limited in particular. The molding aid may be, for example, ethylene glycol, dextrin, fatty acid, fatty acid soap, polyalcohol and the like. Two or more kinds of molding aids may be used.

When preparing the raw material paste, it is preferable for the raw material paste to be mixed and kneaded. The raw material paste can be mixed by using a mixer, an attritor (grinding mill), or the like, and can be kneaded by a kneader or the like.

Then, the raw honeycomb molded body is dried by using a drying apparatus such as a microwave drying apparatus, a hot air drying apparatus, a dielectric drying apparatus, a reduced pressure drying apparatus, a vacuum drying apparatus, and a freeze drying apparatus.

Further, the obtained dried honeycomb molded body is degreased. The degreasing conditions can be arbitrarily selected depending on the amount and kind of organic substances contained in the honeycomb molded body. However, the dried honeycomb molded body is preferably degreased at approximately 400° C. for approximately 2 hours.

Then, by firing the degreased honeycomb molded body, the honeycomb unit 11 having the cylindrical shape is obtained. The firing temperature is preferably approximately 600° C. to approximately 1200° C., and more preferably approximately 600° C. to approximately 1000° C. In a case where the firing temperature is approximately 600° C. or more, the sintering easily progresses, such that it becomes difficult for the strength of the honeycomb unit 11 to decrease. On the other hand, in a case where the firing temperature is approximately 1200° C. or less, the sintering does not excessively progress such that it becomes difficult for the reactive sites of the silico-alumino phosphate to decrease.

Then, an outer peripheral coating layer paste is applied onto an outer peripheral surface of the substantially cylindrical honeycomb unit 11.

The outer peripheral coating layer paste is not limited in particular. The outer peripheral coating layer paste may be, for example, a mixture of an inorganic binder and inorganic particles, a mixture of the inorganic binder and inorganic fibers, a mixture of the inorganic binder, the inorganic particles, and the inorganic fibers and the like.

Further, the outer peripheral coating layer paste may further contain an organic binder.

The organic binder is not limited in particular. The organic binder may be, for example, polyvinyl alcohol, methylcellulose, ethylcellulose, or carboxymethyl cellulose and the like. Two or more kinds of the organic binders may be used.

Then, the aggregate of the honeycomb units 11 being coated with the outer peripheral coating layer paste is solidified by drying. Thereby, a substantially cylindrical shaped honeycomb structural body 10 is obtained. In a case where the outer peripheral coating layer paste of the honeycomb structural body 10 contains an organic binder, a degreasing process is preferably performed on the honeycomb structural body 10. The degreasing conditions can be arbitrarily selected depending on the amount and kind of organic substances. However, the degreasing conditions are preferably at approximately 700° C. for approximately 20 minutes.

It is to be noted that, by having the honeycomb unit 11 steeped into a solution containing copper ions and/or iron ions, the silico-alumino phosphate can be ion exchanged. Further, a raw material paste containing the silico-alumino phosphate being ion exchanged by copper ions and/or iron ions may be used as the raw material paste.

An example of an exhaust gas conversion apparatus is described with reference to FIG. 2. An exhaust gas conversion apparatus according to an embodiment of the present invention includes the honeycomb structural body according to an embodiment of the present invention, a holding sealing member provided at an outer peripheral part of the honeycomb structural body, and a metal pipe having the honeycomb structural body and the holding sealing member installed therein.

In a case where a holding sealing member 20 is provided at an outer peripheral part of the honeycomb structural body 10, an exhaust gas conversion apparatus 100 is obtained by canning the honeycomb structural body 10 to a metal pipe 30. In the exhaust gas conversion apparatus 100, an ejection part (not illustrated) such as an ejection nozzle for ejecting ammonia or a material that generates ammonia is provided at an upstream side of the honeycomb structural body 10 relative to an exhaust gas flowing direction. Thereby, ammonia is added to the exhaust gas. As a result, the NOx gas included in the exhaust gas is reduced by the silico-alumino phosphate included in the honeycomb unit 11.

The material that generates ammonia is not limited in particular as long as the material can generate ammonia in the exhaust gas. Considering preservation stability, it is preferable to use urea water as the material that generates ammonia. It is to be noted that ammonia is generated by heating the urea water in the exhaust gas and hydrolyzing the urea water.

Figure 3:
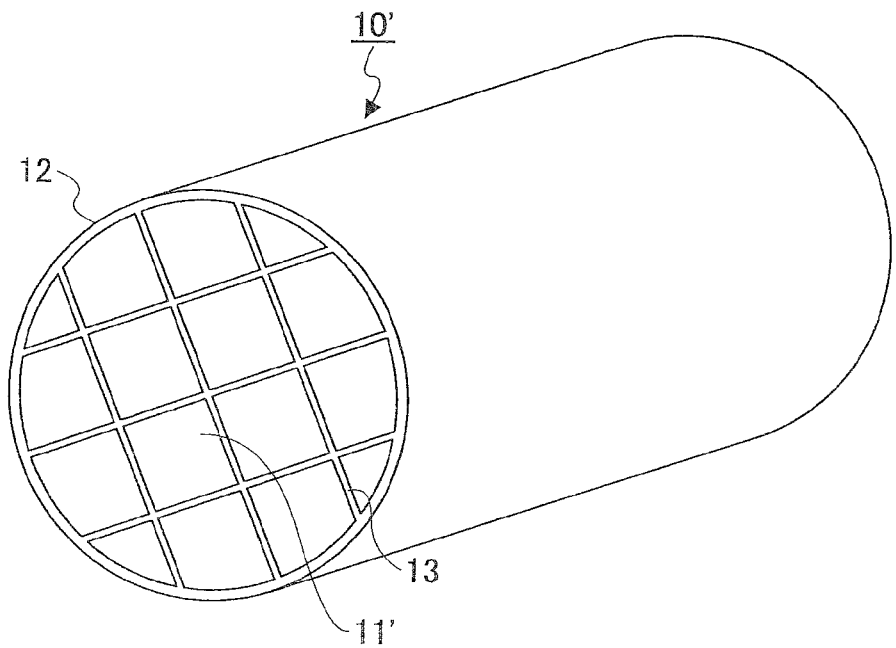
FIG. 3 is a perspective view illustrating another example of a honeycomb structural body according to an embodiment of the present invention.
Figure 4:
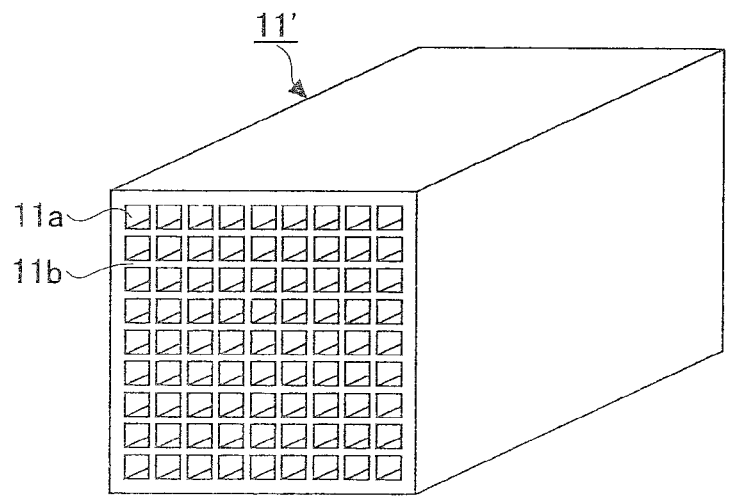
FIG. 4 is a perspective view illustrating the honeycomb unit constituting the honeycomb structural body of FIG. 3.

Another example of the honeycomb structural body 10 according to an embodiment of the present invention is described with reference to FIG. 3. Other than the adhesive layer 13 adhering plural honeycomb units 11 (see FIG. 4) having plural through-holes 11a divided by partition walls 11b and arranged in the longitudinal direction of the honeycomb units 11, the honeycomb structural body 10' is substantially the same as the honeycomb structural body 10.

The cross section of the honeycomb unit 11' perpendicular to the longitudinal direction of the honeycomb unit 11' preferably has an area of approximately 5 $cm^2$ to approximately 50 $cm^2$. In a case where the area of the cross section of the honeycomb unit 11' perpendicular to the longitudinal direction of the honeycomb unit is approximately 5 $cm^2$ or more, it becomes difficult for the pressure loss of the honeycomb structural body 10' to increase. On the other hand, in a case where the area of the cross section of the honeycomb unit 11' perpendicular to the longitudinal direction of the honeycomb unit 11' is approximately 50 $cm^2$ or less, it becomes difficult for the strength against thermal stress of the honeycomb unit 11' to become insufficient.

Other than the cross section of the honeycomb unit 11' perpendicular to the longitudinal direction of the honeycomb unit 11', the honeycomb unit 11' is substantially the same as the honeycomb unit 11.

The thickness of the adhesive layer 13 is preferably approximately 0.5 mm to approximately 2 mm. In a case where the thickness of the adhesive layer 13 is approximately 0.5 mm or more, it becomes difficult for the adhesive strength among the honeycomb units 11' to become insufficient. On the other hand, in a case where the thickness of the adhesive layer is approximately 2 mm or less, it becomes difficult for the pressure loss of the honeycomb structural body 10' to increase.

Further, except for the honeycomb units 11' located at the outer peripheral part of the honeycomb structural body 10', the shape of the honeycomb unit 11' is square pillar. The shape of the honeycomb unit 11' is not limited in particular. For example, the shape of the honeycomb unit 11' may be a hexagonal pillar or the like.

Next, an example of a method for manufacturing the honeycomb structural body 10' according to an embodiment of the present invention is described. First, in the same manner as the honeycomb structural body 10, a honeycomb unit 11' having a substantially square pillar shape is formed. Then, an adhesive layer paste is applied to the outer peripheral surface of the honeycomb unit 11'. Then, such honeycomb units 11' are adhered together and solidified by drying. Thereby, an aggregate of the honeycomb units 11' can be manufactured.

In this case where the aggregate of honeycomb units 11' is manufactured, the aggregate of honeycomb units 11' is cut into a substantially cylindrical shape. According to necessity, the manufactured aggregate of honeycomb units 11' may be polished. The aggregate of honeycomb units 11' having a predetermined shape such as a substantially cylindrical shape may be manufactured by adhering together honeycomb units 11' in which a cross section of the honeycomb unit 11' being perpendicular to the longitudinal direction of the honeycomb unit 11' is formed in a given shape such as a substantially fan-shape or a substantially quadrate shape. Thereby, a process of cutting the outer peripheral surface of the aggregate of the honeycomb units 11' can be omitted.

The adhesive layer paste is not to be limited in particular. The adhesive layer paste may be, for example, a mixture of an inorganic binder and inorganic particles, a mixture of the inorganic binder and inorganic fibers, a mixture of the inorganic binder, the inorganic particles, and the inorganic fibers and the like.

Further, the adhesive layer paste may further contain an organic binder.

The organic binder is not limited in particular. The organic binder may be, for example, polyvinyl alcohol, methylcellulose, ethylcellulose, carboxymethyl cellulose and the like. Two or more kinds of the organic binders may be used.

Then, an outer peripheral coating layer paste is applied to an outer peripheral surface of the substantially cylindrical shaped aggregate of the honeycomb units 11'.

The outer peripheral coating layer paste may be, for example, substantially the same as or different from the material of the adhesive layer paste.

Further, the outer peripheral coating layer paste may have substantially the same composition as the adhesive layer paste.

Then, the aggregate of the honeycomb units 11' being coated with the outer peripheral coating layer paste is solidified by drying. Thereby, a substantially cylindrical shaped honeycomb structural body 10' is obtained. In a case where the adhesive layer paste and/or the outer peripheral coating layer paste of the honeycomb structural body 10' contains an organic binder, a degreasing process is preferably performed on the honeycomb structural body 10'. The degreasing conditions can be arbitrarily selected depending on the amount and kind of organic substances. However, the degreasing conditions are preferably at approximately 700° C. for approximately 20 minutes.

It is to be noted that the honeycomb structural bodies 10 and 10' may be formed without the outer peripheral coating layer 12.

Although the above-described honeycomb structural body includes a honeycomb unit containing silico-alumino phosphate and an inorganic binder and having plural through-holes being divided by partition walls and being arranged in a longitudinal direction thereof, a honeycomb structural body according to other embodiment of the present invention may contain honeycomb unit constituting cordierite, have plural through-holes being divided by partition walls and being arranged in a longitudinal direction thereof, and have silico-alumino phosphate being carried on the partition walls. Thereby, NOx included in exhaust gas can be converted. Further, shrinkage or expansion due to absorbing or desorbing of water can be easily prevented from causing cracks of silico-alumino phosphate and desorption of silico-alumino phosphate.

Even where silico-alumino phosphate is used as the material of the honeycomb structure, the average particle diameter of the primary particles of silico-alumino phosphate is reduced by grinding the silico-alumino phosphate.

The average particle diameter of the primary particles of silico-alumino phosphate is preferably approximately 1 μm to approximately 5 μm. In a case where the average particle diameter of the primary particles of silica-alumino phosphate is approximately 1 μm or more, it becomes easy for the partition walls to carry the silico-alumino phosphate. On the other hand, in a case where the average particle diameter of the primary particles of silico-alumino phosphate is approximately 5 μm or less, it becomes difficult for the specific surface area of the silico-alumino phosphate to be reduced. Thereby, it becomes difficult for the NOx conversion efficiency to be reduced.

Similar to the honeycomb structural body 10 (see FIG. 1), this honeycomb structural body preferably has a single honeycomb unit.

It is to be noted that this honeycomb structural body may be formed with or without an outer peripheral coating layer.

Figure 2:
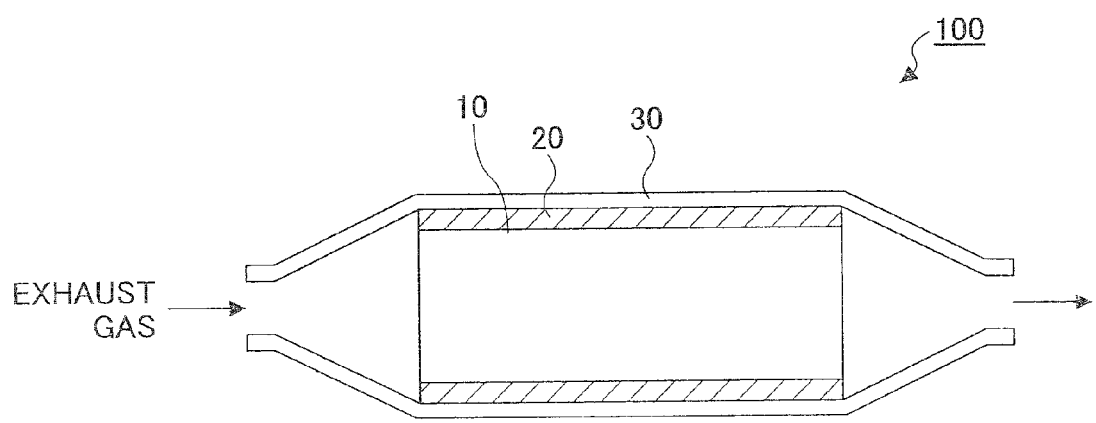
FIG. 2 is a cross-sectional view illustrating an example of an exhaust gas conversion apparatus according to an embodiment of the present invention.

Similar to the honeycomb structural body 10, this honeycomb structural body can be applied to an exhaust gas conversion apparatus as illustrated in FIG. 2.

EXAMPLES

In the following examples, "parts" refers to "parts by mass".

Example 1

A gel precursor was obtained by sequentially adding phosphate as concentration 85% by mass (9.83 parts), aluminum hydroxide as concentration 95% by mass (7 parts), silica sol as solid content 30% by mass (11.1 parts), and morpholine (15 parts) being used as a structure directing agent into water and agitating the water. Then, a silico-alumino phosphate was synthesized by filling the gel precursor in an autoclave (200 ml), rotating the autoclave at a rotation rate of 10 rpm while being heated up to 200° C. at a heat-up rate of 5° C./minute, and retaining the gel precursor inside the autoclave for 24 hours. The amount of substance ratio of Si in the silico-alumino phosphate with respect to a sum of an amount of substance of Al and P was 0.32, and the acid point of the silico-alumino phosphate was 3.0 m mol/g.

Example 2

Except for changing the amount of adding morpholine to 13.1 parts, the silico-alumino phosphate was synthesized in the same manner as Example 1. The amount of substance ratio of Si in the silico-alumino phosphate with respect to a sum of an amount of substance of Al and P was 0.32, and the acid point of the silico-alumino phosphate was 2.2 mmol/g.

Example 3

Except for changing the amount of adding silica sol as solid content 30% mass and the amount of adding morpholine to 9.4 parts by weight and 11.25 parts by weight, respectively, the silico-alumino phosphate was synthesized in the same manner as Example 1. The amount of substance ratio of Si in the silico-alumino phosphate with respect to a sum of an amount of substance of Al and P was 0.26, and the acid point of the silico-alumino phosphate was 2.2 mmol/g.

Example 4

Except for changing the amount of adding morpholine to 7.5 parts, the silico-alumino phosphate was synthesized in the same manner as Example 3. The amount of substance ratio of Si in the silico-alumino phosphate with respect to a sum of an amount of substance of Al and P was 0.26, and the acid point of the silico-alumino phosphate was 1.5 mmol/g.

Example 5

Except for adding 6.3 parts of diethyl-amine instead of adding 7.5 parts of morpholine, the silico-alumino phosphate was synthesized in the same manner as Example 4. The amount of substance ratio of Si in the silico-alumino phosphate with respect to a sum of an amount of substance of Al and P was 0.26, and the acid point of the silico-alumino phosphate was 1.5 mmol/g.

Example 6

Except for changing the amount of adding silica sol as solid content 30 mass % to 7.7 parts, the silico-alumino phosphate was synthesized in the same manner as Example 4. The amount of substance ratio of Si in the silico-alumino phosphate with respect to a sum of an amount of substance of Al and P was 0.22, and the acid point of the silico-alumino phosphate was 1.9 mmol/g.

Example 7

Except for changing the amount of adding silica sol as solid content 30 mass % to 7.7 parts, the silico-alumino phosphate was synthesized in the same manner as Example 5. The amount of substance ratio of Si in the silico-alumino phosphate with respect to a sum of an amount of substance of Al and P was 0.22, and the acid point of the silico-alumino phosphate was 1.5 mmol/g.

Comparative Example 1

Except for changing the amount of adding silica sol as solid content 30 mass % to 4.3 parts, the silico-alumino phosphate was synthesized in the same manner as Example 3. The amount of substance ratio of Si in the silico-alumino phosphate with respect to a sum of an amount of substance of Al and P was 0.11, and the acid point of the silico-alumino phosphate was 1.6 mmol/g.

Comparative Example 2

Except for changing the amount of adding silica sol as solid content 30 mass % to 7.3 parts, the silico-alumino phosphate was synthesized in the same manner as Example 3. The amount of substance ratio of Si in the silico-alumino phosphate with respect to a sum of an amount of substance of Al and P was 0.20, and the acid point of the silico-alumino phosphate was 1.6 mmol/g.

Comparative Example 3

Except for changing the amount of adding silica sol as solid content 30 mass % to 9.0 parts, the silico-alumino phosphate was synthesized in the same manner as Example 5. The amount of substance ratio of Si in the silico-alumino phosphate with respect to a sum of an amount of substance of Al and P was 0.25, and the acid point of the silico-alumino phosphate was 0.7 mmol/g.

Comparative Example 4

Except for changing the amount of adding silica sol as solid content 30 mass % to 10.7 parts, the silico-alumino phosphate was synthesized in the same manner as Example 5. The amount of substance ratio of Si in the silico-alumino phosphate with respect to a sum of an amount of substance of Al and P was 0.30, and the acid point of the silico-alumino phosphate was 0.7 mmol/g.

[Amount of Substance Ratio of Si with Respect to a Sum of an Amount of Substance of Al and P]

The amount of substance ratio of Si in the silico-alumino phosphate with respect to a sum of an amount of substance of Al and P was measured by using a silicon drift energy dispersive x-ray spectrometer XFlash 5030 (manufactured by Bruker Corp.).

[Acid Point]

The acid point of the silico-alumino phosphate was measured by using an automatic temperature programmed desorption spectrometer TPD-1-ATw (manufactured by BEL Japan Inc.). More specifically, 0.05 g of the silico-alumino phosphate was heated up to 500° C. at a rate of 10° C./minute and left for 60 minutes. Then, after the silico-alumino phosphate was cooled to 300° C. and set to a steady state (room temperature, 25° C.). In such a state, ammonia was introduced for 30 minutes so as to be absorbed to the silico-alumino phosphate. Then, after evacuating the ammonia, the silico-alumino phosphate was left for 30 minutes. Then, the silico-alumino phosphate was heated up to 600° C. at a rate of 10° C./minute while introducing helium at a rate of 50 ml/minute. During this period, the quantity of the desorbed ammonia was determined by detecting the peak of $NH_2+$(m/z=16) and calculating the acid point by using a quadrupole mass spectrometer.

[Expansion Rate]

A silico-alumino phosphate absorbed with water of 20 mass % and a silico-alumino phosphate desorbed with water at 200° C. were measured in a range where $2\theta$ is 9° to 21° by using an X-ray diffractometer Rint-Ultima IV (Rigaku Corp.). Then, the intervals "d" between the lattice planes of (101), (110), (021), (003), and (211) were calculated by using Bragg's equation of:

$$2d \sin \theta = n\lambda$$

(wherein "d" indicates the interval between the lattice surfaces, "$\theta$" indicates angle of deviation (supplementary angle of incident angle), "$\lambda$" indicates a wavelength of an X-ray, and "n" indicates a positive integer).

Next, since a lattice constant "a" of an (hkl) plane of a cubic lattice can be represented with an equation of:

$$a = d/(h^2+k^2+l^2)^{1/2},$$

the average "A" of the lattice constants "a" of the (101) plane, the (110) plane, the (021) plane, the (003) plane, and the (211) plane was calculated. Further, the expansion rate was calculated with an equation of:

$$(A_x - A_y)/A_x$$

wherein "$A_x$" indicates the average of the lattice constant of silico-alumino phosphate absorbed with water of 20 mass %, "$A_y$" indicates the average of the lattice constant of silico-alumino phosphate absorbed with water at 200° C.

[Manufacturing of Honeycomb Structural Body]

First, the silico-alumino phosphates of the above-described example 1 to 7 and comparative example 1 to 4 were grinded into primary particles having an average particle diameter of 3 μm. Then, the silico-alumino phosphates were ion exchanged with copper ions by steeping the silico-alumino phosphate into a copper nitrate solution. In measuring the exchange amount of copper ions of the silico-alumino phosphates by performing ICP (Inductively Coupled Plasma) analysis with an ICPS-8100 (manufactured by Shimadzu Corp.), 2.7 mass % was measured.

A raw material paste was prepared by mixing and kneading: silico-alumino phosphate (3100 g) being ion-exhanged with copper ions; boehmite (895 g); alumina fiber (485 g) having an average fiber diameter of 6 μm and an average fiber length of 100 μm; methylcellulose (380 g); oleic acid (280 g); and ion exchanged water (2425 g).

Then, extrusion molding was performed on the raw material paste by using an extruder. Thereby, a raw cylindrical honeycomb molded body was obtained. Then, the honeycomb molded body was dried for 10 minutes at 110° C. by using a microwave drying apparatus and a hot air drying apparatus. Then, the dried honeycomb molded body is degreased at 400° C. for 5 hours. Then, the degreased honeycomb molded body is fired at 700° C. for 2 hours. As described above, a honeycomb unit having a cylindrical shape was manufactured.

An outer peripheral coating layer paste was prepared by mixing and kneading: alumina fiber (767 g) having an average fiber diameter of 0.5 μm and an average fiber length of 15 μm; silica glass (2500 g); carboxyl methylcellulose (17 g); silica sol (600 g) of 30 mass % as solid content; polyvinyl alcohol (167 g); and alumina balloon (17 g).

After applying the outer peripheral coating layer paste to the outer peripheral surface of the honeycomb unit except at an end surface thereof, the outer peripheral coating layer paste was solidified by drying at 120° C. Thereby a honeycomb structural body was obtained. The honeycomb structural body has a cylindrical shape with a diameter of 225.4 mm and a length of 76.2 mm. The thickness of the partition walls was 0.28 mm, and the density of the through-holes was 62 units per $cm^2$.

[NOx Conversion Efficiency]

In a state where an imitation gas of 200° C. is allowed to flow into each honeycomb structural body manufactured by using the silico-alumino phosphates of the above-described example 1 to 7 and comparative example 1 to 4 at a space velocity (SV) of 70000/h, a catalyst evaluation apparatus SIGU (manufactured by Horiba Ltd.) was used to measure the outflow of NOx flowing out from the honeycomb structural bodies with an equation of:

"(inflow of NO−outflow of NO)/(outflow of NOx)×100".

The composition of the imitation gas is Nox (350 ppm) containing 25% of nitrogen dioxide, ammonia (350 ppm), oxygen (14 volume %), water (10 volume %), and nitrogen (balance).

The results of measuring Si/(Al+P), the acid point, the expansion rate of each silico-alumino phosphate of the above-described example 1 to 7 and comparative example 1 to 4, and the NOx conversion efficiency of each honeycomb structure being manufactured with the silico-alumino phosphate of the above-described example 1 to 7 and comparative example 1 to 4 are shown in Table 1.

TABLE 1

| | SILICO-ALUMINO PHOSPHATE | | | NOx |
| --- | --- | --- | --- | --- |
| | Si/ (Al + P) | ACID POINT [mmol/g] | EXPANSION COEFFICIENT [%] | CONVERSION RATE [%] |
| EXAMPLE 1 | 0.32 | 3.0 | 0 | 88 |
| EXAMPLE 2 | 0.32 | 2.2 | 0 | 88 |
| EXAMPLE 3 | 0.26 | 2.2 | 0.1 | 86 |
| EXAMPLE 4 | 0.26 | 1.5 | 0.1 | 80 |
| EXAMPLE 5 | 0.26 | 1.5 | 0.1 | 83 |
| EXAMPLE 6 | 0.22 | 1.9 | 0.9 | 86 |
| EXAMPLE 7 | 0.22 | 1.5 | 0.9 | 81 |
| COMPARATIVE EXAMPLE 1 | 0.11 | 1.6 | 3.0 | 80 |
| COMPARATIVE EXAMPLE 2 | 0.20 | 1.6 | 1.1 | 82 |
| COMPARATIVE EXAMPLE 3 | 0.25 | 0.7 | 0.2 | 58 |
| COMPARATIVE EXAMPLE 4 | 0.30 | 0.7 | 0 | 60 |

It is to be noted that "Si/(Al+P)" indicates the amount of substance ratio of Si in the silico-alumino phosphate with respect to a sum of an amount of substance of Al and P.

According to Table 1, it can be understood that the silico-alumino phosphates of the above-described examples 1 to 7 have an expansion rate less than 1%. Further, it is considered that shrinkage or expansion due to absorbing or desorbing of water can be prevented from causing cracks of the honeycomb units constituting the honeycomb structural body. Further, it can be understood that the honeycomb structural body having honeycomb units manufactured by using the silico-alumino phosphate of the examples 1 to 7 has excellent NOx conversion efficiency and has an NOx conversion rate of 80% or more.

It can be understood that the expansion rate exceeds 1% because the amount of substance ratio of Si in the silico-alumino phosphate with respect to a sum of an amount of substance of Al and P is low in the case of the silico-alumino phosphate according to the comparative examples 1 and 2. Therefore, with the comparative examples 1 and 2, it is difficult to prevent shrinkage or expansion due to absorbing or desorbing of water can be prevented from causing cracks of the honeycomb units constituting the honeycomb structural body.

Further, because the silico-alumino phosphates of the comparative examples 3 and 4 have a low acid point (acid point is 0.7), it can be understood that a honeycomb structural body having honeycomb units using the silico-alumino phosphates of the comparative examples 3 and 4 have NOx conversion efficiency being easily decreased and have an NOx conversion rate of 60% or less.

Obviously, numerous modifications and variations of the present invention are possible in light of the above teachings. It is therefore to be understood that within the scope of the appended claims, the invention may be practiced otherwise than as specifically described herein.

What is claimed is:

1. A silico-alumino phosphate comprising:
   Si;
   Al; and
   P, a ratio of an amount of substance of Si to a sum of an amount of substance of Al and an amount of substance of P being approximately 0.22 or more and approximately 0.33 or less, an acid point being approximately 1.2 mmol/g or more.

2. The silico-alumino phosphate as claimed in claim 1, wherein the silico-alumino phosphate is ion-exchanged with at least one of a copper ion and an iron ion.

3. The silico-alumino phosphate as claimed in claim 1, wherein the ratio of the amount of substance of Si to the sum of the amount of substance of Al and the amount of substance of P is approximately 0.26 or more and approximately 0.33 or less.

4. The silico-alumino phosphate as claimed in claim 1, wherein an upper limit of the acid point of the silico-alumino phosphate is a theoretical value calculated from a formula (A)

$$\text{the theoretical value} = (\text{ratio of the amount of substance of Si to the sum of the amount of substance of Al and P}) \times 12.9 \text{ [mmol/g]} \quad (A).$$

5. A honeycomb structural body comprising:
   a honeycomb unit including the silico-alumino phosphate as claimed in claim 1 and an inorganic binder, the honeycomb unit having a plurality of through-holes divided by a plurality of partition walls and arranged in a longitudinal direction of the honeycomb unit.

6. The honeycomb structural body as claimed in claim 5, wherein the silico-alumino phosphate forms a plurality of particles, and an average diameter of original particles of the plurality of particles is approximately 1 μm or more and approximately 5 μm or less.

7. The honeycomb structural body as claimed in claim 5, wherein the inorganic binder includes a solid containing at least one selected from a group of alumina sol, silica sol, titania sol, soluble glass, sepiolite, attapulgite, and boehmite.

8. The honeycomb structural body as claimed in claim 5, wherein the silico-alumino phosphate is ion-exchanged with at least one of a copper ion and an iron ion.

9. The honeycomb structural body as claimed in claim 8, wherein the silico-alumino phosphate is ion-exchanged with at least one of a copper ion and an iron ion, and an ion exchange amount is from approximately 1.0 to approximately 5.0 mass %.

10. The honeycomb structural body as claimed in claim 5, wherein the ratio of the amount of substance of Si to the sum of the amount of substance of Al and the amount of substance of P is approximately 0.26 or more and approximately 0.33 or less.

11. The honeycomb structural body as claimed in claim 5, wherein an upper limit of the acid point of the silico-alumino phosphate is a theoretical value calculated from a formula (A), $$\text{the theoretical value} = (\text{ratio of the amount of substance of Si to the sum of the amount of substance of Al and P}) \times 12.9 \text{ [mmol/g]} \quad (A).$$

12. The honeycomb structural body as claimed in claim 5, wherein the honeycomb unit includes at least one material selected from a group of an inorganic fiber, a scale-like material, a tetrapod-shaped material, and a three-dimensional needle-shaped material.

13. The honeycomb structural body as claimed in claim 12, wherein
   the inorganic fiber includes at least one selected from a group of alumina fiber, silica fiber, silicon carbide fiber, silica alumina fiber, glass fiber, potassium titanate fiber, and aluminum borate fiber,
   the scale-like material includes at least one selected from a group of glass, muscovite, alumina, and silica,
   the tetrapod-shaped material includes zinc oxide, and the three-dimensional needle-shaped material includes at least one selected from alumina, silica, silicon carbide, silica alumina, glass, potassium titanate, aluminum borate, and boehmite.

14. The honeycomb structural body as claimed in claim 12, wherein a content of at least one selected from a group of the inorganic fiber, the scale-like material, tetrapod-shaped material, and the three-dimensional needle-like material in the honeycomb unit is from approximately 3 mass % to approximately 50 mass %.

15. The honeycomb structural body as claimed in claim 5, wherein a number of the honeycomb units is two or more.

16. The honeycomb structural body as claimed in claim 5, wherein a number of the honeycomb units is one.

17. The honeycomb structural body as claimed in claim 5, further comprising an outer peripheral coating layer formed on an outer peripheral surface of the honeycomb structural body.

18. The honeycomb structural body as claimed in claim 5, wherein a content of the silico-alumino phosphate by weight per apparent volume is from approximately 230 to approximately 360 g/L.

19. The honeycomb structural body as claimed in claim 5, wherein a content of the inorganic binder as a solid component in the honeycomb unit is from approximately 5 to approximately 30 mass %.

20. The honeycomb structural body as claimed in claim 5, wherein a porosity of the honeycomb unit is from approximately 25% to approximately 40%.

21. The honeycomb structural body as claimed in claim 5, wherein an aperture ratio of a cross section of the honeycomb unit perpendicular to the longitudinal direction of the honeycomb unit is from approximately 50% to approximately 75%.

22. The honeycomb structural body as claimed in claim 5, a density of the through-holes of a cross section perpendicular to the longitudinal direction of the honeycomb unit is from approximately 31 to approximately 155 units per cm$^2$.

23. The honeycomb structural body as claimed in claim 5, wherein a thickness of each of the plurality of partition walls of the honeycomb unit is from approximately 0.10 mm to approximately 0.50 mm.

24. A honeycomb structural body comprising:
a honeycomb unit including cordierite and having a plurality of through-holes divided by a plurality of partition walls and arranged in a longitudinal direction of the honeycomb unit, wherein the plurality of partition walls carry the silico-alumino phosphate of claim 1.

25. The honeycomb structural body as claimed in claim 24, wherein the silico-alumino phosphate is ion-exchanged with at least of one of a copper ion and an iron ion.

26. The honeycomb structural body as claimed in claim 24, wherein the ratio of the amount of substance of Si to the sum of the amount of substance of Al and the amount of substance of P is approximately 0.26 or more and approximately 0.33 or less.

27. The honeycomb structural body as claimed in claim 24, wherein an upper limit of the acid point of the silico-alumino phosphate is a theoretical value calculated from a formula (A), $$\text{the theoretical value} = (\text{ratio of the amount of substance of Si to the sum of the amount of substance of Al and P}) \times 12.9 \text{ [mmol/g]}. \quad (A)$$

28. The honeycomb structural body as claimed in claim 24, wherein the silico-alumino phosphate forms a plurality of particles, and an average diameter of original particles of the plurality of particles is approximately 1 μm or more and approximately 5 μm or less.

29. The honeycomb structural body as claimed in claim 24, wherein a number of the honeycomb units is one.

30. The honeycomb structural body as claimed in claim 24, further comprising an outer peripheral coating layer formed on an outer peripheral surface of the honeycomb structural body.

31. An exhaust gas conversion apparatus comprising:
the honeycomb structural body as claimed in claim 24;
a holding sealing member provided at an outer peripheral portion of the honeycomb structural body; and
a metal pipe having the honeycomb structural body and the holding sealing member installed in the metal pipe.

32. The exhaust gas conversion apparatus as claimed in claim 31, wherein the silico-alumino phosphate is ion-exchanged with at least one of a copper ion and an iron ion.

33. The exhaust gas conversion apparatus as claimed in claim 31, wherein the ratio of the amount of substance of Si to the sum of the amount of substance of Al and the amount of substance of P is approximately 0.26 or more and approximately 0.33 or less.

34. The exhaust gas conversion apparatus as claimed in claim 31, wherein an upper limit of the acid point of the silico-alumino phosphate is a theoretical value calculated from a formula (A), $$\text{The theoretical value} = (\text{ratio of the amount of substance of Si to the sum of the amount of substance of Al and P}) \times 12.9 \text{ [mmol/g]} \quad (A).$$

35. The exhaust gas conversion apparatus as claimed in claim 31, wherein the silico-alumino phosphate has forms a plurality of particles, and an average diameter of original particles of the plurality of particle is approximately 1 μm or more and approximately 5 μm or less.

36. The exhaust gas conversion apparatus as claimed in claim 31, wherein a number of the honeycomb units is one.

37. The exhaust gas conversion apparatus as claimed in claim 31, further comprising an outer peripheral coating layer formed on an outer peripheral surface of the honeycomb structural body.

38. An exhaust gas conversion apparatus comprising:
the honeycomb structural body as claimed in claim 5;
a holding sealing member provided at an outer peripheral portion of the honeycomb structural body; and
a metal pipe having the honeycomb structural body and the holding sealing member installed in the metal pipe.

39. The exhaust gas conversion apparatus as claimed in claim 38, wherein the silico-alumino phosphate forms a plurality of particles, and an average diameter of original particles of the plurality of particles is 1 μm or more and approximately 5 μm or less.

40. The exhaust gas conversion apparatus as claimed in claim 38, wherein the inorganic binder includes a solid containing at least one selected from a group of alumina sol, silica sol, titania sol, soluble glass, sepiolite, attapulgite, and boehmite.

41. The exhaust gas conversion apparatus as claimed in claim 38, wherein the silico-alumino phosphate is ion-exchanged with at least one of a copper ion and an iron ion.

42. The exhaust gas conversion apparatus as claimed in claim 38, wherein the ratio of the amount of substance of Si to the sum of the amount of substance of Al and the amount of substance of P is approximately 0.26 or more and approximately 0.33 or less.

43. The exhaust gas conversion apparatus as claimed in claim 38, wherein an upper limit of the acid point of the silico-alumino phosphate is a theoretical value calculated from a formula (A), the theoretical value=(ratio of the amount of substance of Si to the sum of the amount of substance of Al and P)×12.9 [mmol/g]  (A).

44. The exhaust gas conversion apparatus as claimed in claim 38, wherein the silico-alumino phosphate is ion-exchanged with at least one of a copper ion and an iron ion, and an ion exchange amount is from approximately 1.0 to approximately 5.0 mass %.

45. The exhaust gas conversion apparatus as claimed in claim 44, wherein
the inorganic fiber includes at least one selected from a group of alumina fiber, silica fiber, silicon carbide fiber, silica alumina fiber, glass fiber, potassium titanate fiber, and aluminum borate fiber,
the scale-like material includes one least one selected from a group of glass, muscovite, alumina, and silica,
the tetrapod-shaped material includes zinc oxide, and
the three-dimensional needle-shaped material includes at least one selected from alumina, silica, silicon carbide, silica alumina, glass, potassium titanate, aluminum borate, and boehmite.

46. The exhaust gas conversion apparatus as claimed in claim 45 wherein the honeycomb unit includes at least one material selected from a group of an inorganic fiber, a scale-like material, a tetrapod-shaped material, and a three-dimensional needle-shaped material.

47. The exhaust gas conversion apparatus as claimed in claim 38, wherein a number of the honeycomb units is two or more.

48. The exhaust gas conversion apparatus as claimed in claim 38, wherein a number of the honeycomb units is one.

49. The exhaust gas conversion apparatus as claimed in claim 38, further comprising an outer peripheral coating layer formed on an outer peripheral surface of the honeycomb structural body.

50. The exhaust gas conversion apparatus as claimed in claim 38, wherein a content of a silico-alumino phosphate by weight per apparent volume in the honeycomb unit is from approximately 230 to approximately 360 g/L.

51. The exhaust gas conversion apparatus as claimed in claim 38, wherein a content of the inorganic binder as a solid component of the honeycomb unit is from approximately 5 to approximately 30 mass %.

52. The exhaust gas conversion apparatus as claimed in claim 46, wherein a content of at least one selected from a group of the inorganic fiber, the scale-like material, the tetrapod-shaped material, and the three-dimensional needle-like material in the honeycomb unit is from approximately 3 mass % to approximately 50 mass %.

53. The exhaust gas conversion apparatus as claimed in claim 38, wherein a porosity of the honeycomb unit is from approximately 25% to approximately 40%.

54. The exhaust gas conversion apparatus as claimed in claim 38, wherein an aperture ratio of a cross section of the honeycomb unit perpendicular to the longitudinal direction of the honeycomb unit is from approximately 50% to approximately 75%.

55. The exhaust gas conversion apparatus as claimed in claim 38, a density of the through-holes of the cross section perpendicular to the longitudinal direction of the honeycomb unit is from approximately 31 to approximately 155 units per $cm^2$.

56. The exhaust gas conversion apparatus as claimed in claim 38, wherein a thickness of each of the plurality of the partition walls of the honeycomb unit is from approximately 0.10 mm to approximately 0.50 mm.

* * * * *